United States Patent
Tsuruta et al.

(10) Patent No.: US 7,627,047 B2
(45) Date of Patent: Dec. 1, 2009

(54) ORTHOGONAL FREQUENCY DIVISION MULTIPLEXING (OFDM) RECEIVER

(75) Inventors: Makoto Tsuruta, Kawasaki (JP); Hidehiro Matsuoka, Yokohama (JP); Hideo Kasami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 756 days.

(21) Appl. No.: 11/288,112

(22) Filed: Nov. 29, 2005

(65) Prior Publication Data

US 2006/0115011 A1 Jun. 1, 2006

(30) Foreign Application Priority Data

Nov. 30, 2004 (JP) .............................. 2004-347106

(51) Int. Cl.
*H04K 1/10* (2006.01)
(52) U.S. Cl. ..................... 375/260; 375/150; 370/208; 370/210; 370/331; 370/332; 455/63.1; 455/65; 455/59; 455/24
(58) Field of Classification Search ................. 375/260, 375/150; 370/208, 210, 331, 332; 455/63.1, 455/65
See application file for complete search history.

(56) References Cited

U.S. PATENT DOCUMENTS 6,999,724 B2 * 2/2006 Chizhik et al. ............. 455/63.1

| 7,042,858 | B1 * | 5/2006 | Ma et al. ..................... 370/331 |
| 7,054,397 | B1 * | 5/2006 | Kawanabe ................... 375/347 |
| 7,280,579 | B2 * | 10/2007 | Dobson et al. .............. 375/130 |
| 2003/0053412 | A1 * | 3/2003 | Yoshida et al. ............. 370/208 |
| 2004/0008614 | A1 * | 1/2004 | Matsuoka et al. ........... 370/203 |

FOREIGN PATENT DOCUMENTS

| EP | 1450497 A2 * | 8/2004 |
| JP | 9-284251 | 10/1997 |
| JP | 10-65610 | 3/1998 |
| JP | 2001-28576 | 1/2001 |
| JP | 2003-283405 | 10/2003 |
| JP | 2004-260774 | 9/2004 |

* cited by examiner

*Primary Examiner*—Shuwang Liu
*Assistant Examiner*—Helene Tayong
(74) *Attorney, Agent, or Firm*—Oblon, Spivak, McClelland, Maier & Neustadt, L.L.P.

(57) ABSTRACT

An OFDM receiver apparatus mounted on a movable object for receiving an OFDM signal, includes a plurality of directional antennas which receive an OFDM signal, an estimator to estimate a center frequency of a spectrum of a Doppler component from one of the received signals or a multiplexed signal obtained by multiplexing the received signals, a shift quantity calculator to calculate a shift quantity from the estimated center frequency of the estimator and directivity information representing directivity directions of the directional antennas, a plurality of frequency shifters to subject the received signals to frequency shift according to the shift quantity to compensate for Doppler shift, a combining unit to diversity-combine frequency shifted signals of the frequency shifters, and a demodulator/decoder to demodulate and decode combining diversity signals of the combining unit.

19 Claims, 10 Drawing Sheets

ORTHOGONAL FREQUENCY DIVISION MULTIPLEXING (OFDM) RECEIVER

CROSS-REFERENCE TO RELATED APPLICATIONS

This application is based upon and claims the benefit of priority from prior Japanese Patent Application No. 2004-347106, filed Nov. 30, 2004, the entire contents of which are incorporated herein by reference.

BACKGROUND OF THE INVENTION

1. Field of the Invention

The present invention relates to an orthogonal frequency division multiplexing (OFDM) receiver using an a plurality of antennas mounted on a movable object, particularly a technology to reduce an interference between carriers due to Doppler shift associated with movement of the movable object.

2. Description of the Related Art

In ground digital broadcasting, OFDM is adopted. When an OFDM signal is received in a movable object such as a car, inter-carrier interferences (ICI) due to Doppler shift occurred by a high-speed movement of the movable object must be considered.

Receivers mounted on the movable object and receiving an OFDM signal have been proposed. In a receiver proposed by, for example, Japanese Patent Laid-Open No. 9-284251, the OFDM signal is received by a plurality of antennas arranged so as to provide directivities in different directions, signals of a desired channel are extracted from received signals output the antennas, respectively, and sent to automatic frequency control (AFC) circuits, respectively. The AFC circuits remove frequency errors of the received signals due to Doppler shift. The received signals from which the frequency errors are removed are combined with a combining unit. The output signal of the combining unit is sent to the demodulator/decoder and OFDM-demodulated and decoded. As a result, influence of the inter-carrier interferences due to Doppler shift is removed. Therefore, it is possible to reproduce information of a video and a speech.

Generally, a large scale circuit is necessary for detecting frequency errors due to Doppler shift. It is thought that the above proposed technology detects frequency errors due to Doppler shift from the received signals from the antennas, independently. Accordingly, a circuit scale increases with an increase of the number of antennas. This contributes to large-sizing of the receiver and increase of power consumption.

It is an object of the present invention to provide an OFDM receiver for a movable object, which makes it possible to decrease a circuit scale to be necessary for an estimation of Doppler frequency without depending on increase of the number of antennas.

BRIEF SUMMARY OF THE INVENTION

An aspect of the present invention provides an OFDM receiver apparatus mounted on a movable object for receiving an orthogonal frequency division multiplex (OFDM) signal, the OFDM receiver apparatus comprising: a plurality of directional antennas which receive an OFDM signal and output received signals, respectively; an estimator to estimate a center frequency of a spectrum of a Doppler component from one of the received signals or a multiplexed signal obtained by multiplexing the received signals; a shift quantity calculator to calculate at least one shift quantity from the estimated center frequency of the estimator and directivity information representing directivity directions of the directional antennas; a plurality of frequency shifters to subject the received signals to frequency shift according to the shift quantity to compensate for Doppler shift; a combining unit to diversity-combine frequency shifted signals of the frequency shifters; and a demodulator/decoder to demodulate and decode combining diversity signals of the combining unit.

DETAILED DESCRIPTION OF THE INVENTION

There will now be described embodiments of the present invention in conjunction with accompanying drawings.

First Embodiment

Figure 1:
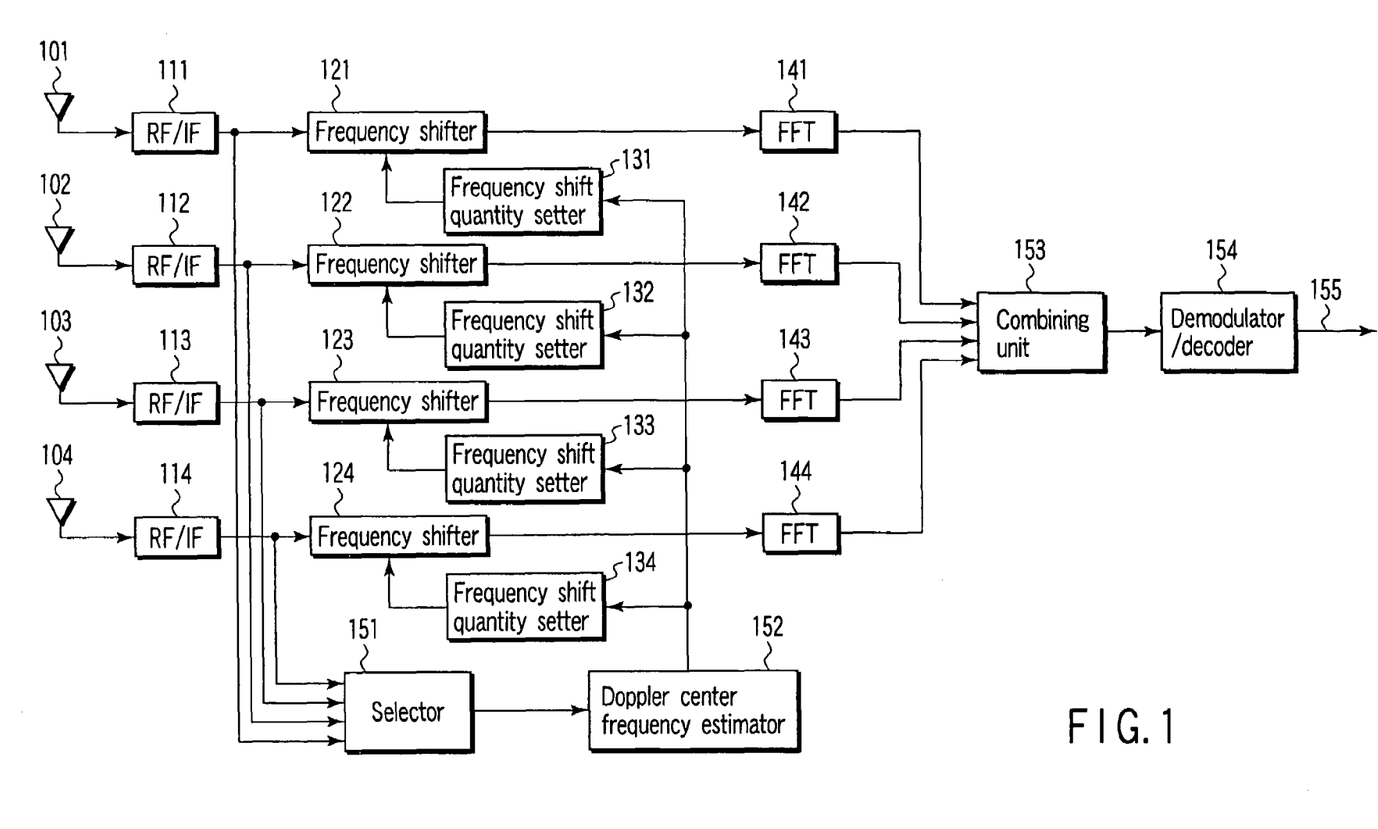
FIG. 1 is a block diagram, which shows an OFDM receiver for a movable object concerning the first embodiment of the present invention.

As shown in FIG. 1, an OFDM signal is received with a plurality of directional antennas (referred to as antennas hereinafter) 101-104 in an OFDM receiver for a movable object, concerning the first embodiment of the present invention. The present embodiment uses four antennas 101-104, but can apply to a case using directional antennas not less than 2 and not more than 3 or not less than 5. Adaptive array antennas or sector antennas may be used for the directional antennas 101-104.

The present embodiment supposes that when the movable object is a vehicle such as a car and a receiver including the antennas 101-104 is mounted on the vehicle, antennas of single directivity are used for antennas 101-104, and the antennas 101-104 are arranged on the vehicle with directivities given in four directions of all around with respect to a moving direction (traveling direction) of the vehicle.

The received signals of a RF (radio frequency) band output from the antennas 101-104 by receiving an OFDM signal are input to RF/IF units 111-114, respectively. The RF/IF units 111-114 each include a channel selection filter which selects a received signal of a desired channel, a low noise amplifier (LNA) which amplifies the selected received signal, a frequency converter (down converter) which converts the amplified received signal of the RF band into a signal of an IF (intermediate frequency) band, and a filter which removes uselessness waves.

The received signals of IF band output from the RF/IF units 111-114 are input into frequency shifters 121-124, respectively, and subjected to frequency shift of shift quantities set with frequency shift quantity setters 131-134. As a result, Doppler shift occurring in the received signal in association with movement of the movable object is compensated for. The signals subjected to frequency shift with the frequency shifters 121-124 are converted from signals of time domain to signals of frequency domain by fast Fourier transform (FFT) units 141-144, respectively.

Output signals from the FFT units 141-144 are input to a combining unit 153 and subjected to diversity-combining. The combining diversity signal is demodulated and decoded with the demodulator/decoder 154 to reproduce a data signal 155.

In a technique of diversity combining, there are a broad band diversity combining and a subband (narrow-band) diversity combining. Further, there is a subcarrier diversity combining which is peculiar to OFDM. Each of the broad band diversity combining, the narrow-band diversity combining and the subcarrier diversity combining involves the following combining:

(a) equal gain combining for combining a plurality of input signals to make them in phase (b) selective combining for selecting some of the input signals and combining the selected input signals, and (c) maximum ratio combining for combining a plurality of input signals with the amplitude and phase that a signal to noise ratio (SNR) of the combined signal becomes maximum.

In the present embodiment, the output signals of broad band from the FFT units 141-144 are combined in diversity with the combining unit 153. Therefore, the output signals may be combined in diversity before FFT. This is a broad band or narrow-band diversity combining.

Since the receiver including the antennas 101-104 is mounted on a movable object such as a vehicle, the signals received with the antennas 101-104 are subjected to Doppler shift, namely to frequency shift due to Doppler effect occurring with movement of the movable object. For this reason, in the present embodiment, Doppler shift is compensated for as follows.

The received signals from the antennas 101-104 are input to a selector 151 through the RF/IF units 111-114, respectively. The selector 151 selects one or more signals from the received signals. The selector 151 can select one or more signals according to the following methods based on directivity information of the antennas 101-104.

(a) a method of selecting a received signal from the antenna having directivity in a moving direction of the movable object, (b) a method of selecting a received signal from the antenna having directivity in a reverse direction with respect to a moving direction of the movable object, and (c) a method of selecting a received signal of an antenna having good reception characteristics from among an antenna having directivity in a moving direction of the moving object and an antenna having directivity in a reverse direction with respect to a moving direction of the movable object.

The received signal selected with the selector 151 is input to the Doppler center frequency estimator 152. The Doppler center frequency estimator 152 estimates a center frequency (referred to as Doppler center frequency) of a spectrum (a spectrum density function) of a Doppler component in the received signal from the selector 152.

A method of estimating a Doppler center frequency will be described in detail later. Information of the estimated Doppler center frequency is input to the frequency shift quantity setters 121-124. The frequency shift quantity setters 121-124 are supplied with the directivity information representing a direction of directivity (beam) of the antennas 101-104, calculate a frequency shift quantity from the Doppler center frequency and directivity information, and set it to the frequency shifters 121-124.

The Doppler center frequency estimator 152 is explained in detail referring to FIGS. 2 to 10. The Doppler center frequency estimator shown in FIG. 2 estimates channel state information (CSI) with a CSI estimator 201 using a known signal sequence 200 (referred to as a pilot signal) included in the OFDM signal. CSI is information indicating a channel response in each of unit planes obtained by dividing an OFDM plane of the pilot signal 200, which has a subcarrier direction (a frequency axis) and a symbol direction (a time axis), in a subcarrier unit and a symbol unit.

Figure 2A:
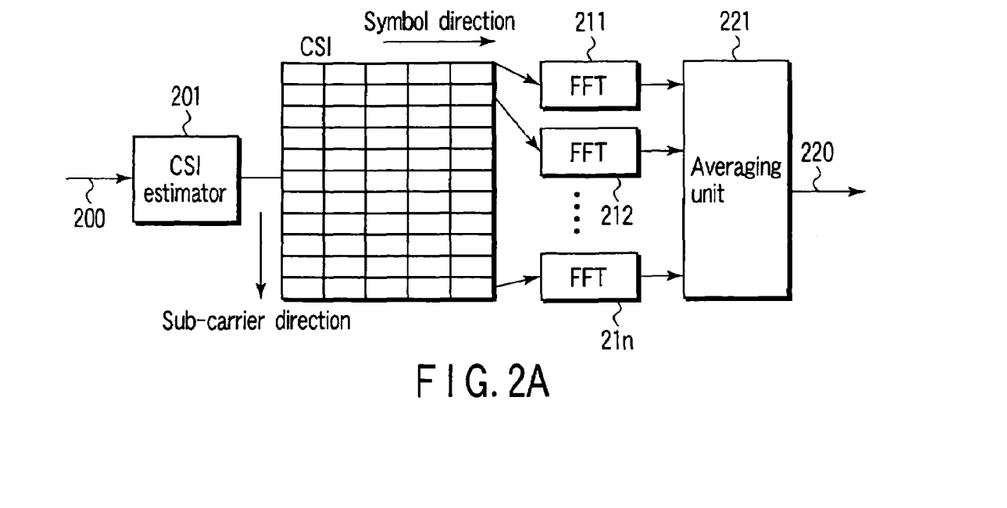
FIG. 2A is a block diagram of a Doppler center frequency estimator.

When Doppler shift occurs, a time variation of the subcarrier occurs in the estimated CSI. Consequently, a Doppler component is extracted by subjecting CSI to FFT with FFT units 211-21$n$ with respect to a time variation of each subcarrier, namely a symbol direction of the channel response to estimate the Doppler center frequency. Because a time change appears in a symbol direction of CSI, the Doppler component can be obtained by calculating a time variation of a complex amplitude.

Figure 2B:
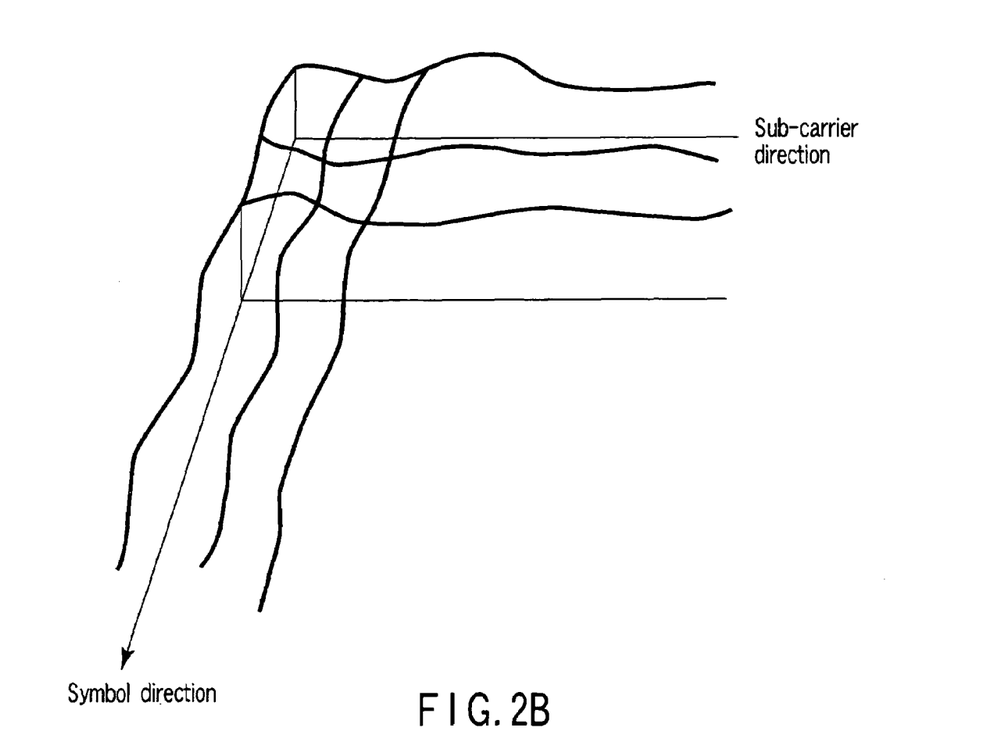
FIG. 2B is a diagram for explaining an operation of a Doppler center frequency estimator.

The Doppler center frequency estimation is described more concretely. FIG. 2B shows CSI in a subcarrier direction x and a symbol direction t in correspondence with FIG. 2A. When the symbol of the OFDM signal is generated at time t, a transfer function is obtained. This transfer function corresponds to a Fourier transform of a variation of a time direction. Accordingly, the transfer function has only to be observed in a time direction. Therefore, if transfer functions are gathered in a direction in, for example, fc=0, a variation is obtained as shown in FIG. 2B. Because this variation is a time variation, if this is divided into blocks and each of the blocks is subjected to FFT, a Doppler spectrum is produced.

Only one Doppler spectrum is few in the number of samples. Accordingly, when a big noise occurs, a noise to signal ratio may deteriorate. Consequently, the Doppler spectrum is clipped with respect to all subcarriers, because the Doppler spectrum is influenced together with each subcarrier When all Doppler spectra clipped with respect to all subcarriers are added and averaged, a stable Doppler spectrum is obtained.

In this embodiment, the Doppler component is calculated using FFT. However, the Doppler component may be calculated by another calculation technique. For example, when there is no known signal, a technique of extracting a Doppler component using a correlation between guard intervals is provided. The Doppler center frequency represents a center frequency of a spectrum of a Doppler component as described previously, and can be computed as expectation of a spectrum density function of a Doppler component or an arithmetic mean of a frequency of both ends of a Doppler component.

In an example of the Doppler center frequency estimator shown in FIG. 2, the Doppler components extracted from subcarriers of the pilot signal with the FFT units 211-21n are averaged between subcarriers with an averaging unit 221, to obtain a center frequency of a spectrum of the averaged Doppler component as a Doppler center frequency. Information 220 of the obtained Doppler center frequency is supplied to the frequency shift quantity setters 121-124 of FIG. 1. Because the Doppler components corresponding to the subcarriers are identical, SNR is improved by averaging the Doppler components between the subcarriers, to make it possible to improve the estimation precision of the Doppler center frequency.

Figure 3:
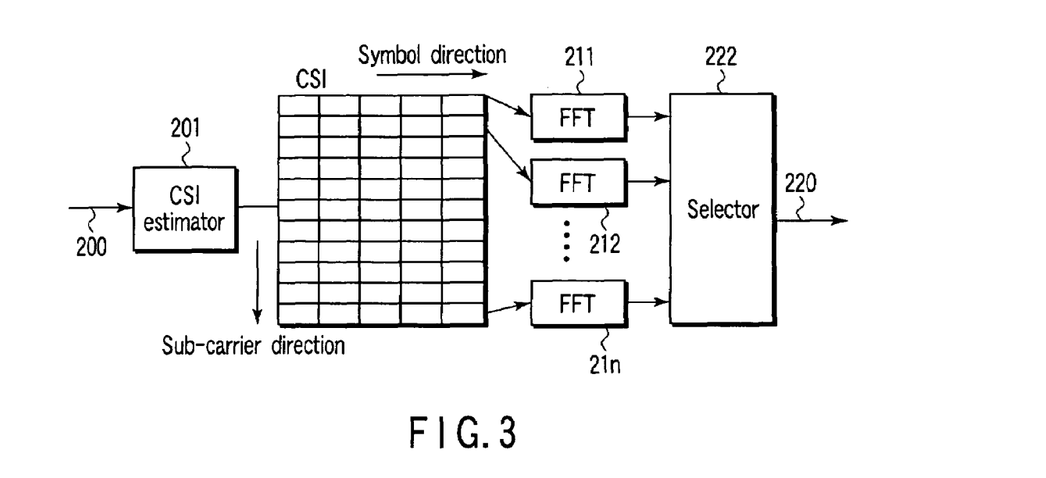
FIG. 3 is a block diagram of another Doppler center frequency estimator.

In the Doppler center frequency estimator shown in FIG. 3, a Doppler component having a relatively large signal-noise ratio (SNR) is selected with the selector 222 from among the Doppler components extracted from the subcarriers of the pilot signal with the FFT units 211-21n, and a center frequency of a spectrum of the selected Doppler component is obtained as a Doppler center frequency, whereby estimation precision is improved.

Figure 4:
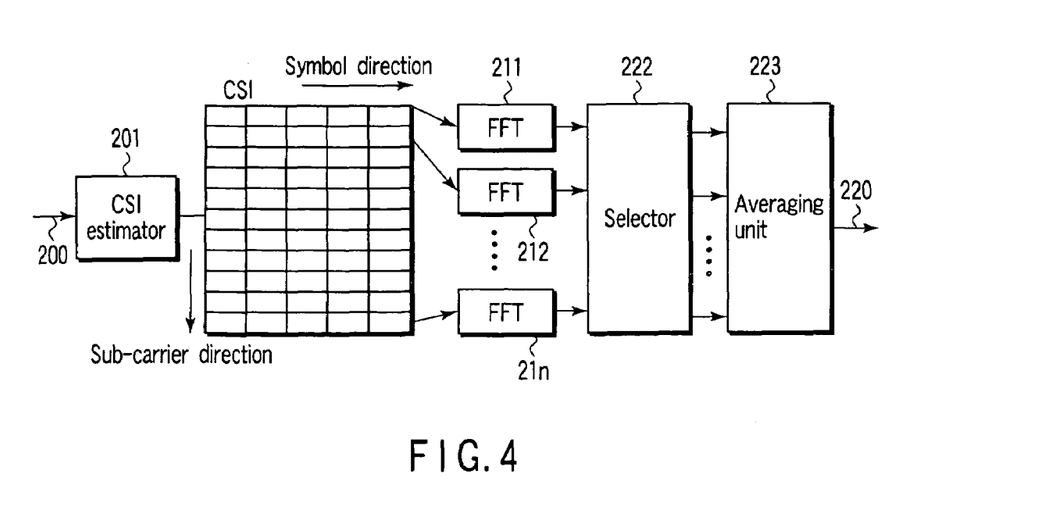
FIG. 4 is a block diagram of a further another Doppler center frequency estimator.

The Doppler center frequency estimator shown in FIG. 4 is combination of the Doppler center frequency estimators shown in FIGS. 2 and 3. In other words, a plurality of Doppler components having good SNR are selected from among the Doppler components extracted from the subcarriers, and the selected Doppler components are averaged between the subcarriers with the averaging unit 223. The estimation precision is more improved by obtaining the center frequency of a spectrum of the averaged Doppler component as a Doppler center frequency.

Figure 5:
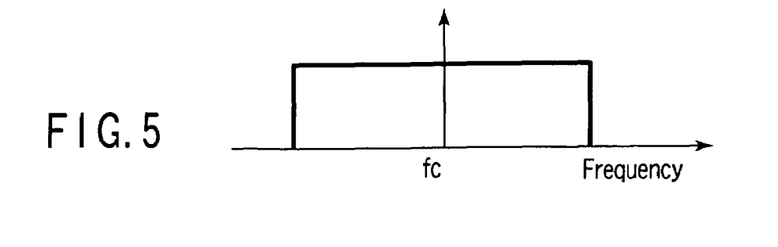
FIG. 5 is a diagram of describing a Doppler component when an OFDM signal is received by an omni antenna.
Figure 6:
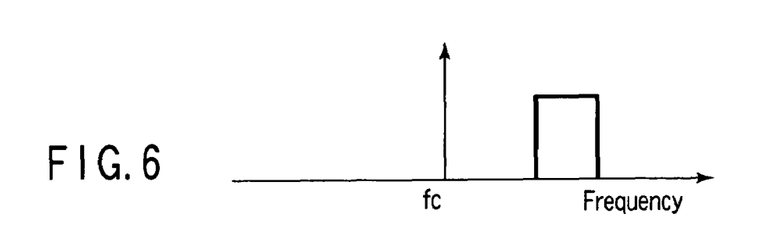
FIG. 6 is a diagram of describing a Doppler component when an OFDM signal is received by a directional antenna.

FIGS. 5 and 6 each show schematically a Doppler component included in a received signal. FIG. 5 shows a Doppler component obtained when receiving an OFDM signal using a nondirectional antenna, which is symmetrical in plus and minus to the carrier frequency fc as a center. In this case, the Doppler center frequency coincides with the carrier frequency fc.

Figure 7:
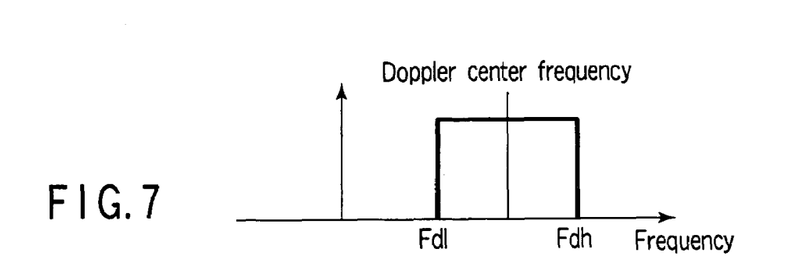
FIG. 7 is a diagram of explaining an example of an estimation method of Doppler center frequency.

On the other hand, in the present embodiment, since the OFDM signal is received with the directional antennas 101-104, the Doppler component is limited in an expanse of frequency as shown in FIG. 6, and exists in the upper or lower frequency band than the carrier frequency fc. Therefore, the frequency corresponding to the center of the Doppler component is assumed to be a Doppler center frequency, and an arithmetic mean of the lowest frequency Fdl and highest frequency Fdh of the Doppler component is assumed to be a Doppler center frequency as shown in FIG. 7.

A method of calculating a frequency shift quantity with the frequency shift quantity setters 121-124 will be described in detail. The frequency shift quantity setters 121-124 each calculate a frequency shift quantity based on a Doppler center frequency estimated by the Doppler center frequency estimator 152 and directivity information of the antennas 101-104.

In the embodiment of FIG. 1, the Doppler center frequency is estimated by selecting a received signal from one antenna with the selector 151, and supplying it to the Doppler center frequency estimator 152. When the selector 151 selects a received signal from, for example, the antenna 101, the Doppler center frequency estimator 152 estimates a Doppler center frequency of the received signal from the antenna 101. In this case, the frequency setter 131 corresponding to the antenna 101 has only to set a difference between the Doppler center frequency estimated by the Doppler center frequency estimator 152 and the carrier frequency fc as a frequency shift quantity as is.

On the other hand, the frequency setters 132-134 corresponding to the antennas 102-104 other than the antenna 101 each do not use the Doppler center frequency estimated by the Doppler center frequency estimator 152, but calculate a frequency shift quantity corresponding to the Doppler center frequency of the received signal from each of the antennas 102-104 using the directivity information of the antennas 102-104. In other words, the frequency shift quantity corresponding to the received signal of each of the antennas 102-104 is calculated by weighting the frequency shift quantity set by the frequency setter 131 by the directivity information of each of the antennas 101-104.

Figure 8:
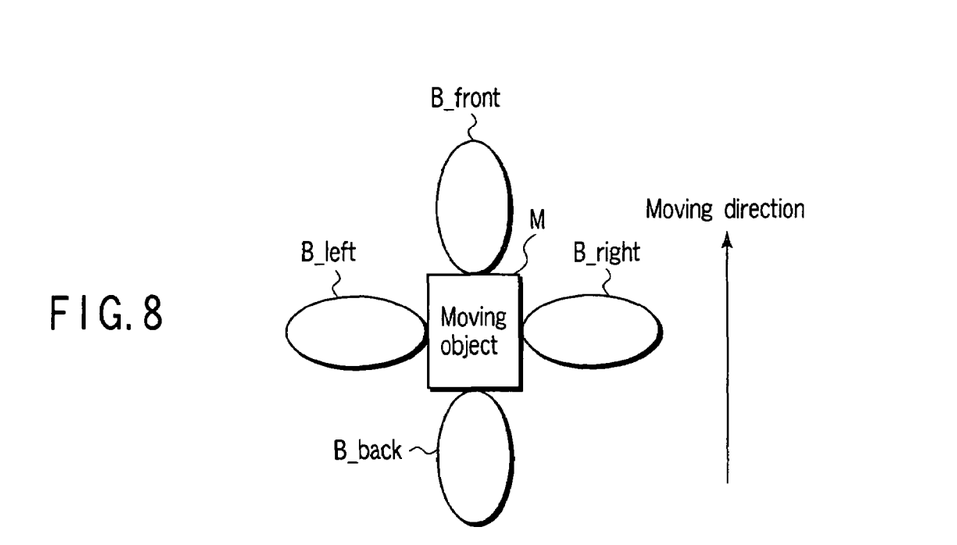
FIG. 8 is a diagram showing a concrete layout of directional antennas.
Figure 9:
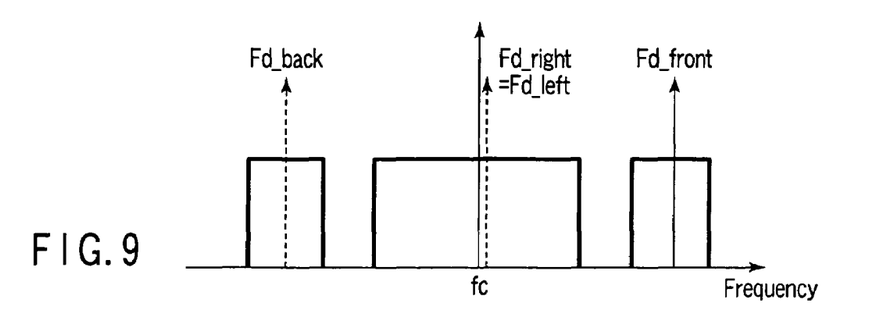
FIG. 9 is a diagram of describing a Doppler component observed in a received signal from each antenna in the layout of FIG. 8.

As a concrete example, a case that the antennas 101-104 are arranged with directivity in four directions of all around with respect to a moving direction (traveling direction) of a movable object such as a vehicle is considered. In other words, the antennas 101-104 are assumed to be form four beams B_front, B_back, B_left and B_right toward four direction of all around with respect to a moving direction of a movable object as shown in FIG. 8. In this case, such Doppler components as shown in FIG. 9 are observed in the received signal from each of the antennas 101-104. In other words, a Doppler component of the maximum frequency (center frequency Fd_front) on the right side in FIG. 9 is observed in the received signal from an antenna (e.g. antenna 101) forming a beam B_front forward the moving direction of the movable object. A Doppler component of the minimum frequency (center frequency Fd_front) on the left side in FIG. 9 is observed in the received signal from an antenna (e.g. antenna 102) forming a beam B_back backward the moving direction. The Doppler center frequency Fd_front of the received signal from the antenna 101 and the Doppler center frequency Fd_back of the received signal from the antenna 102 are symmetric with respect to the carrier frequency fc (Fd_front-fc=fc-Fd_back).

On the other hand, the Doppler components of substantially the same frequency are observed in the output signals from the antennas (i.e., antennas 103 and 104) forming the right and left beams B_left and B_right in the moving direction. The center frequencies fd_left and fd_right coincide with the carrier frequency fc (fd_left=fd_right=fc). In other words, the beams B_left and B_right are toward a direction of 90° with respect to the moving direction, so that Doppler shift does not occur in the received signals from the antennas 103 and 104.

As described above, the Doppler center frequency estimator 152 estimates the Doppler center frequency Fd_front of the Doppler component of the received signal from, for example, the antenna 101 forming the beam B_front forward the moving direction. Information of the estimated Doppler center frequency Fd_front is supplied to the frequency shift quantity setters 131-134.

Because the frequency setter 131 recognizes from directivity information that the beam of the corresponding antenna 101 is toward a direction forward the moving direction, it sets a difference fc-Fd_front between the Doppler center frequency Fd_front and the carrier frequency fc as a frequency shift quantity. Because the frequency setter 132 recognizes from directivity information that the beam of the corresponding antenna 102 is toward a direction backward the moving direction, it sets fc-Fd_back=Fd_front-fc as a frequency shift quantity. The frequency shift quantity setters 133 and 134 recognize from directivity information that the beams of corresponding antennas 103 and 104 are toward right and left directions with respect to the moving direction, namely directions perpendicular to the moving direction. That is, it sets the frequency shift quantity to 0, because it recognizes that Doppler shift is not occurred in the input signal.

As thus described, according to the present embodiment, the Doppler shift is compensated with the frequency shifters 121-124 with an expanse of a Doppler component being limited by receiving a signal with the directional antennas 101-104. As a result, a high-speed fading environment can be converted into a low-speed fading environment in equivalence. In other words, an inter-subcarrier interference can be reduced, and thus the present embodiment can adapt to a wide environment change from a low-speed movement of the movable object to a high-speed movement thereof.

When the Doppler center frequency is estimated with the Doppler center frequency estimator 152 with respect to one received signal selected from a plurality of received signals with the selector 151, an operation quantity can be reduced, resulting in decreasing a circuit scale.

If the selector 151 selects a received signal from the antenna 101 having directivity forward the moving direction, the Doppler center frequency estimator 151 extracts the positive maximum Doppler component. As a result, an effect of reducing fading due to the positive Doppler shift is obtained. On the other hand, If the selector 151 selects a received signal from the antenna 102 having directivity backward the moving direction, the Doppler center frequency estimator 151 extracts the negative maximum Doppler component. As a result, an effect of reducing fading due to the negative Doppler shift is obtained.

When the selector 151 selects a signal having a good receiving quality from among the received signals from the antennas 101 having directivity forward the moving direction and the antenna 102 having directivity backward the moving direction, fading can be reduced with high reliability, whereby an effect reducing ICI more effectively is obtained. The selector 151 in FIG. 1 may select a plurality of, for example, two of the received signals input from the antennas 101-104 through the IF/RF units 111-114, and supplies them to the Doppler center frequency estimator 152.

Figure 10:
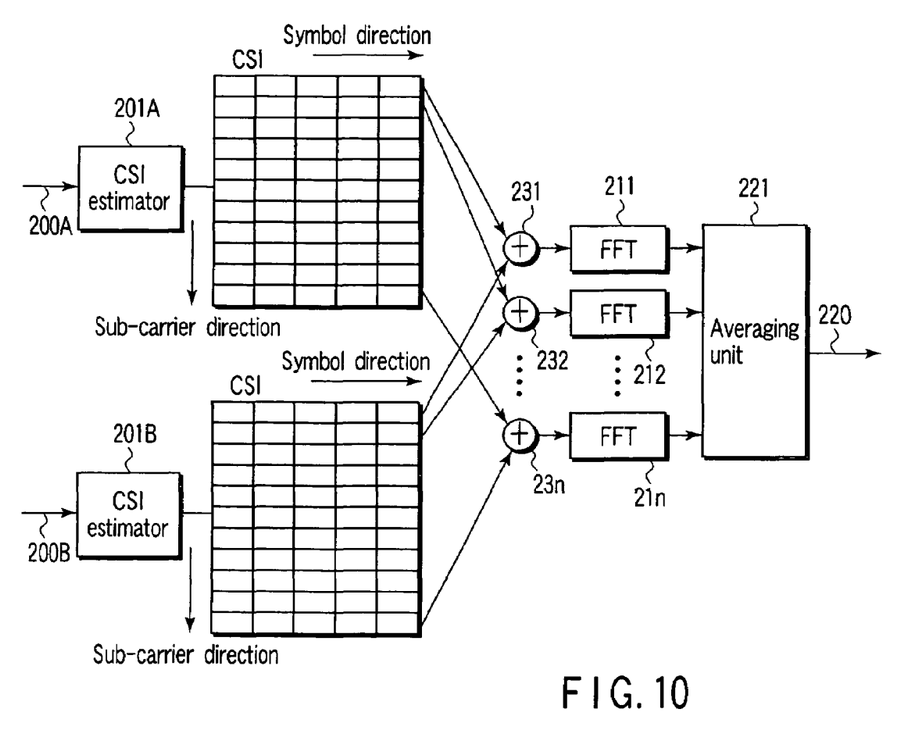
FIG. 10 is a block diagram of a still further another Doppler center frequency estimator.

In the Doppler center frequency estimator shown in FIG. 10, the known signal sequences (pilot signals) 200A and 200B included in the OFDM signals received by two antennas are input to CSI estimators 201A and 201B to estimate CSI of each signal sequence. The CSIs estimated by the CSI estimators 201A and 201B are input to adders 231-23n to add subcarriers of the pilot signals which correspond to each other. The output signals of the adders 231-23n are input to FFT 211-21n, respectively, to extract Doppler components from the output signals. The extracted Doppler components are averaged between subcarriers with the averaging unit 221 to obtain a Doppler center frequency. Information 220 of obtained Doppler center frequency is supplied to the frequency shift quantity setters 121-124 in FIG. 1. Because the Doppler components on the subcarriers are identical, SNR is improved by averaging the Doppler components between subcarriers, to make it possible to improve estimation precision of the Doppler center frequency.

Figure 11:
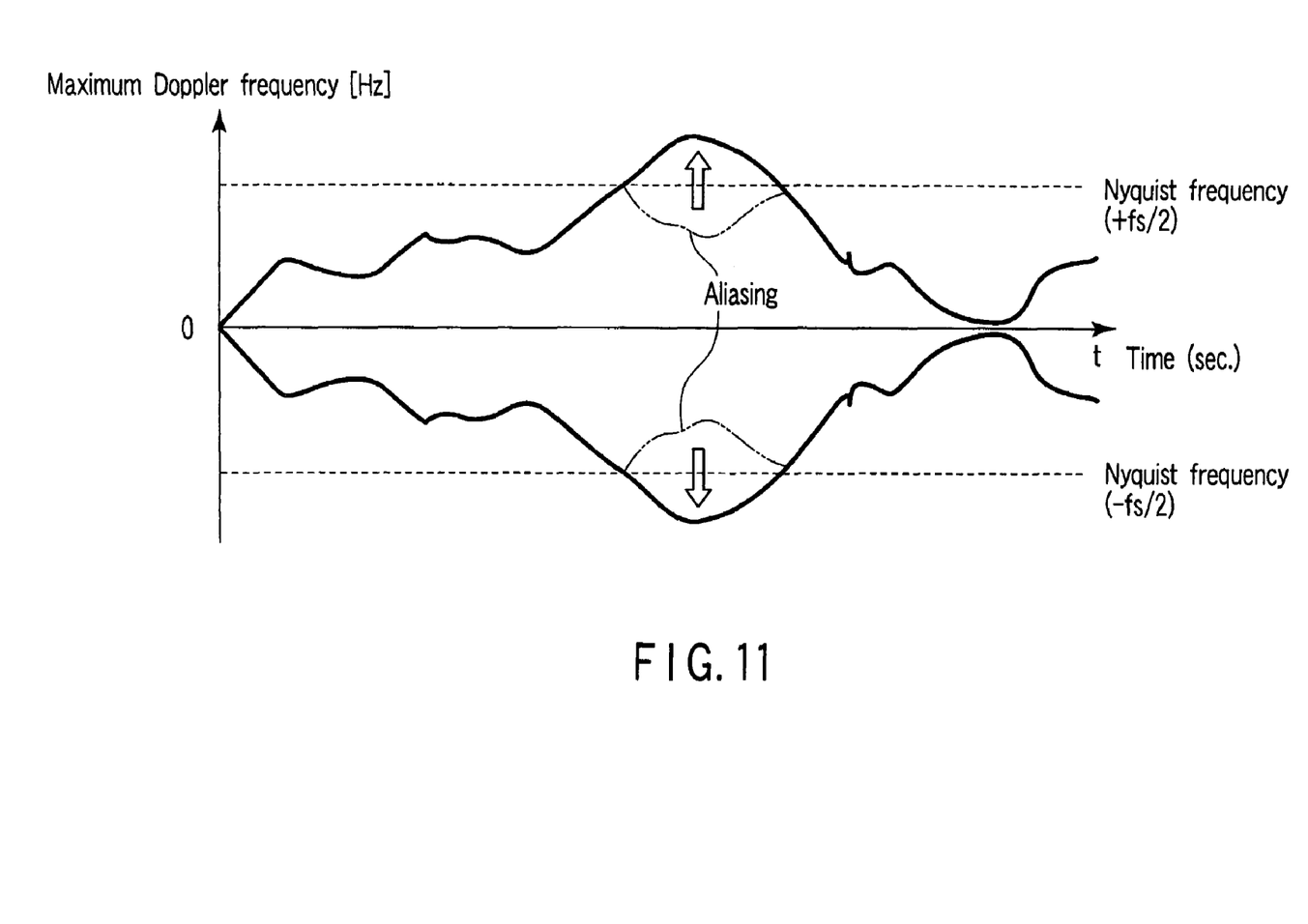
FIG. 11 is a diagram of describing the state that an aliasing occurs in a Doppler component at the time of an estimation of Doppler center frequency and a method of correcting the aliasing.

When the Doppler center frequency estimator 152 estimates a Doppler center frequency, the maximum Doppler center frequency may exceed an interval between the pilot signals, that is, Nyquist frequency as shown in FIG. 11. In FIG. 11, the Nyquist frequency is +fs/2, −fs/2 (fs is sampling frequency) using a zero frequency as a reference. When the maximum Doppler center frequency exceeds +fs/2 in a positive direction or −fs/2 in a negative direction, aliasing occurs as shown in dashed line. When such aliasing occurs, it is impossible to estimate the Doppler center frequency accurately.

However, the Doppler component has time continuity generally, so that the aliasing can be corrected using this nature. In other words, when the aliasing occurs, a time discontinuity point appears in the Doppler component. If the time discontinuity point appears, it is determined that the aliasing occurs in an interval between this time discontinuity point and a next time discontinuity point, and an aliasing part is reversed in polarity. As a result, the Doppler component that the aliasing is compensated for as shown in a solid line in FIG. 11 is obtained. If the Doppler center frequency of the Doppler component that the aliasing is compensated for is estimated, a right estimation can be realized.

Second Embodiment

Figure 12:
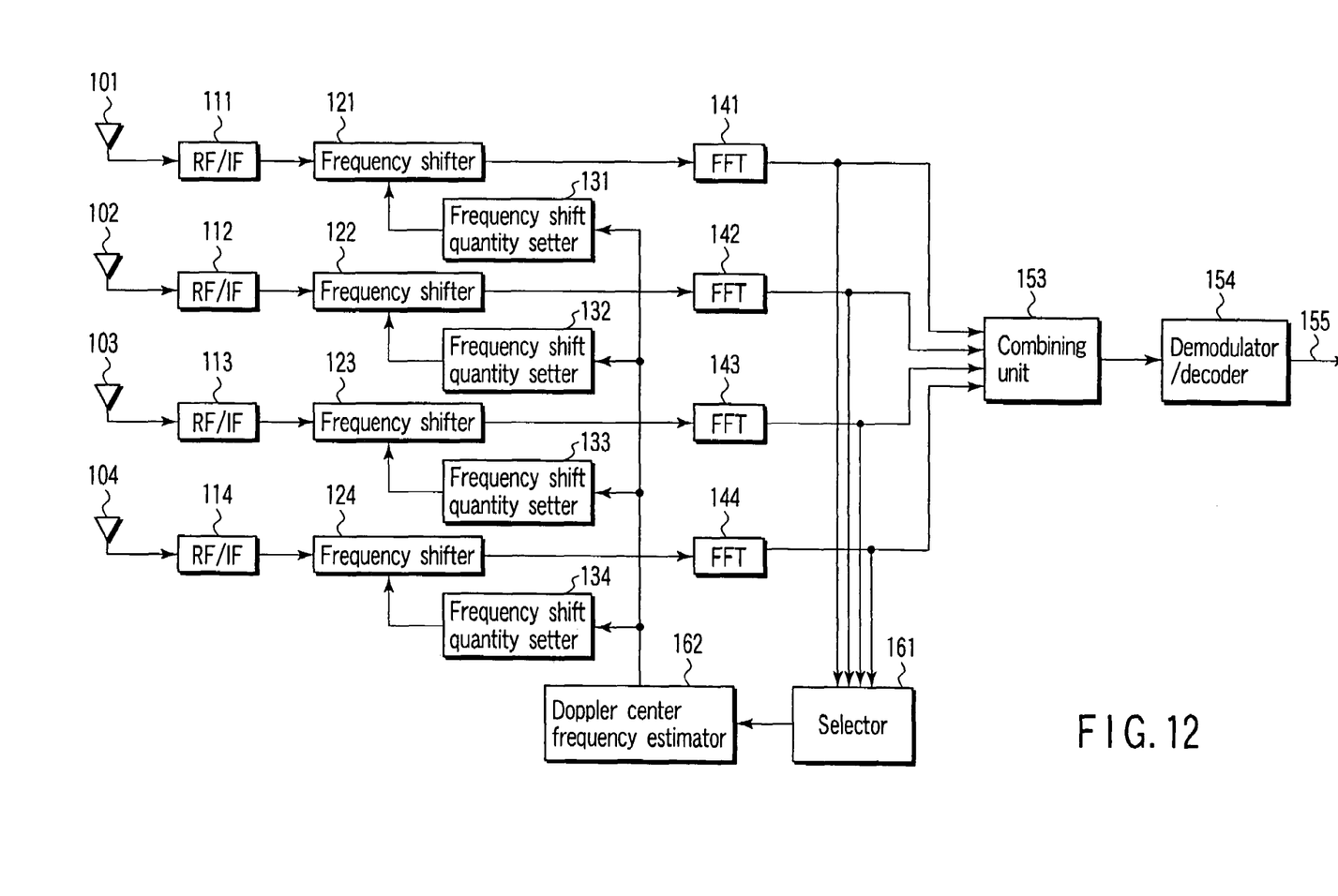
FIG. 12 is a block diagram of an OFDM receiver for a movable object, concerning the second embodiment of the present invention.

In the embodiment of FIG. 1, the output signals from the RF/IF units 111-114 are input to the selector 151. In contrast, in the second embodiment of the present invention, the output signals from the FFT units 141-144 are input to a selector 161 as shown in FIG. 12, one or more signals are selected. The signal selected with the selector 161 is input to the Doppler center frequency estimator 162 to estimate a Doppler center frequency like the first embodiment. A process after the Doppler center frequency estimation is similar to the first embodiment.

The Doppler component corresponding to each of the subcarriers of the received signals converted into a frequency domain with the FFT units 141-144 is convoluted with an approximately equivalent Doppler component. Utilizing this convolution, in the embodiment of FIG. 12, the selector 161 selects one or more signals from the output signals of the FFT units 141-144, and the Doppler center frequency estimator 162 estimates a Doppler center frequency. An advantage of the second embodiment is similar to the first embodiment, and thus its description is omitted.

Third Embodiment

Figure 13:
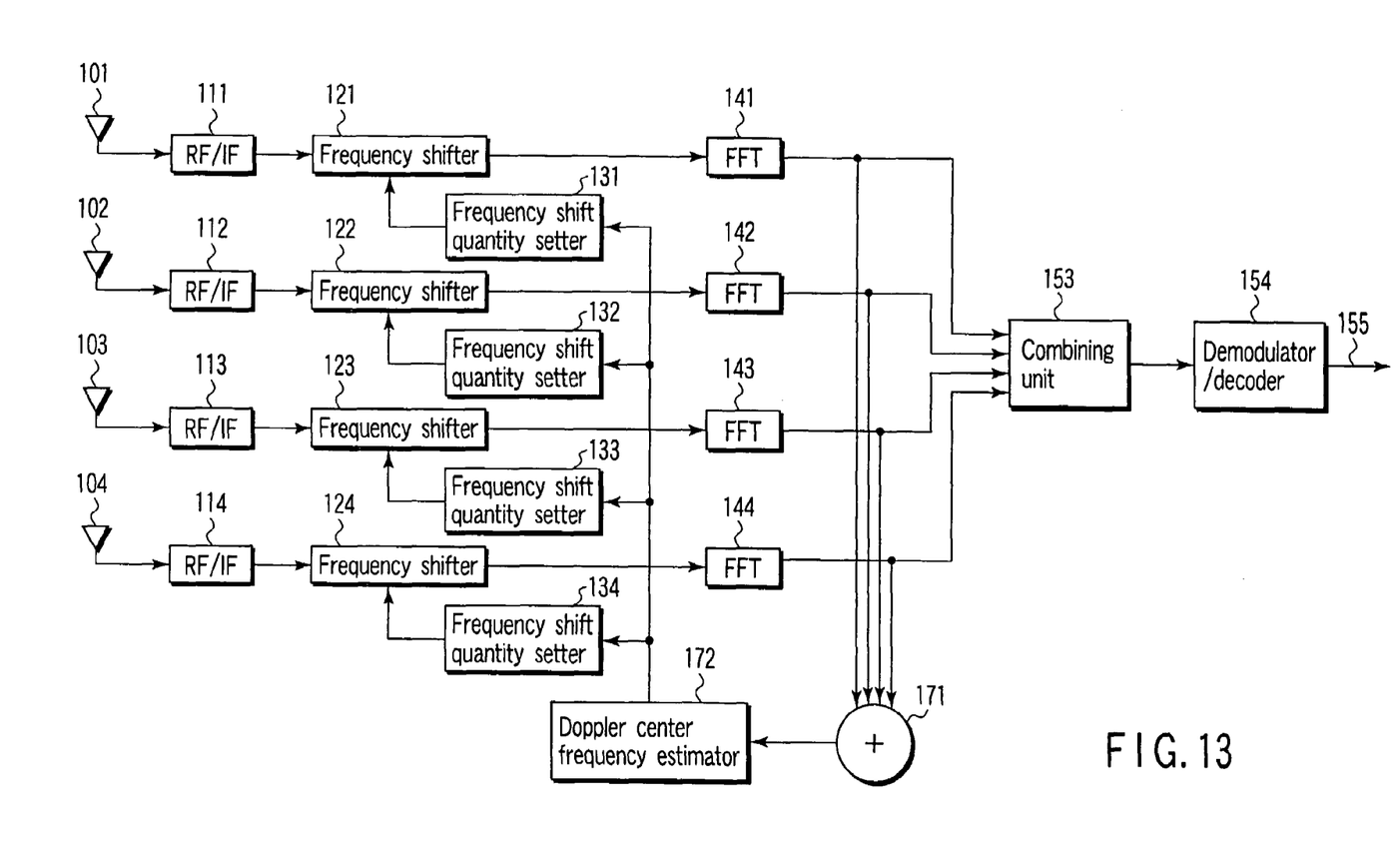
FIG. 13 is a block diagram of an OFDM receiver for a movable object, concerning the third embodiment of the present invention.

In the third embodiment of the present invention, a multiplexer 171 multiplexes the output signals from FFT units 141-144 as shown in FIG. 13. The maltiplexed signal of the multiplexer 171 is input to a Doppler center frequency estimator 172 to estimate a Doppler center frequency.

The multiplexer 171 outputs all spectra of a plurality of Doppler components shown in FIG. 9, for example. The Doppler center frequency estimator 172 receives all Doppler center frequencies of FIG. 9, for example, Fd_front, Fd_back, fd_left and fd_right (where, fd_left=fd_right=fc).

In the third embodiment as described above, by combining time variation components of the Doppler components of the received signals from the antennas 101-104, a single Doppler center frequency estimator, that is, the Doppler center frequency estimator 172 can estimate Doppler center frequencies of the received signals from a plurality of antennas 101-104 collectively. Another effect of the third embodiment is similar to the first embodiment, and thus its description is omitted.

Fourth Embodiment

Figure 14:
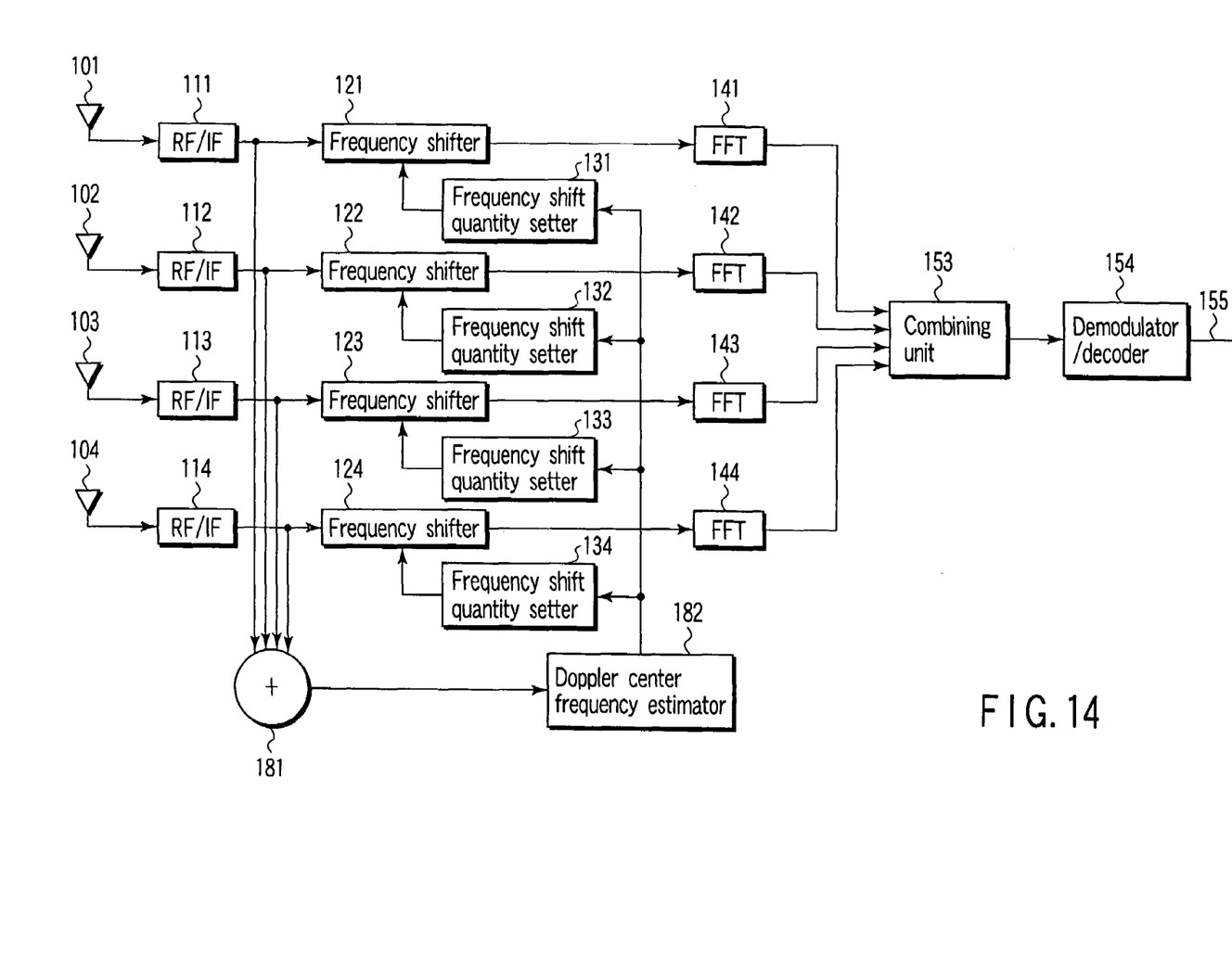
FIG. 14 is a block diagram of an OFDM receiver for a movable object, concerning the fourth embodiment of the present invention.

According to the fourth embodiment of the present invention, output signals from RF/IF units 111-114 are input to a multiplexer 181 as shown in FIG. 14. The signal multiplexed with the multiplexer 181 is input to a Doppler center frequency estimator 182 to estimate a Doppler center frequency. The multiplexer 181 outputs all spectra of a plurality of Doppler components shown in FIG. 9, for example, and the Doppler center frequency estimator 182 receives all Doppler center frequencies of FIG. 9, namely Fd_front, Fd_back, fd_left and fd_right (where fd_left=fd_right=fc).

As thus described in the fourth embodiment, by combining time variation components of the Doppler components of the received signals from the antennas 101-104, a single Doppler center frequency estimator, that is, the Doppler center frequency estimator 182 can estimate Doppler center frequencies of the received signals from a plurality of antennas 101-104 collectively, like the third embodiment. Another effect of the third embodiment is similar to the first embodiment, and thus its description is omitted.

Fifth Embodiment

Figure 15:
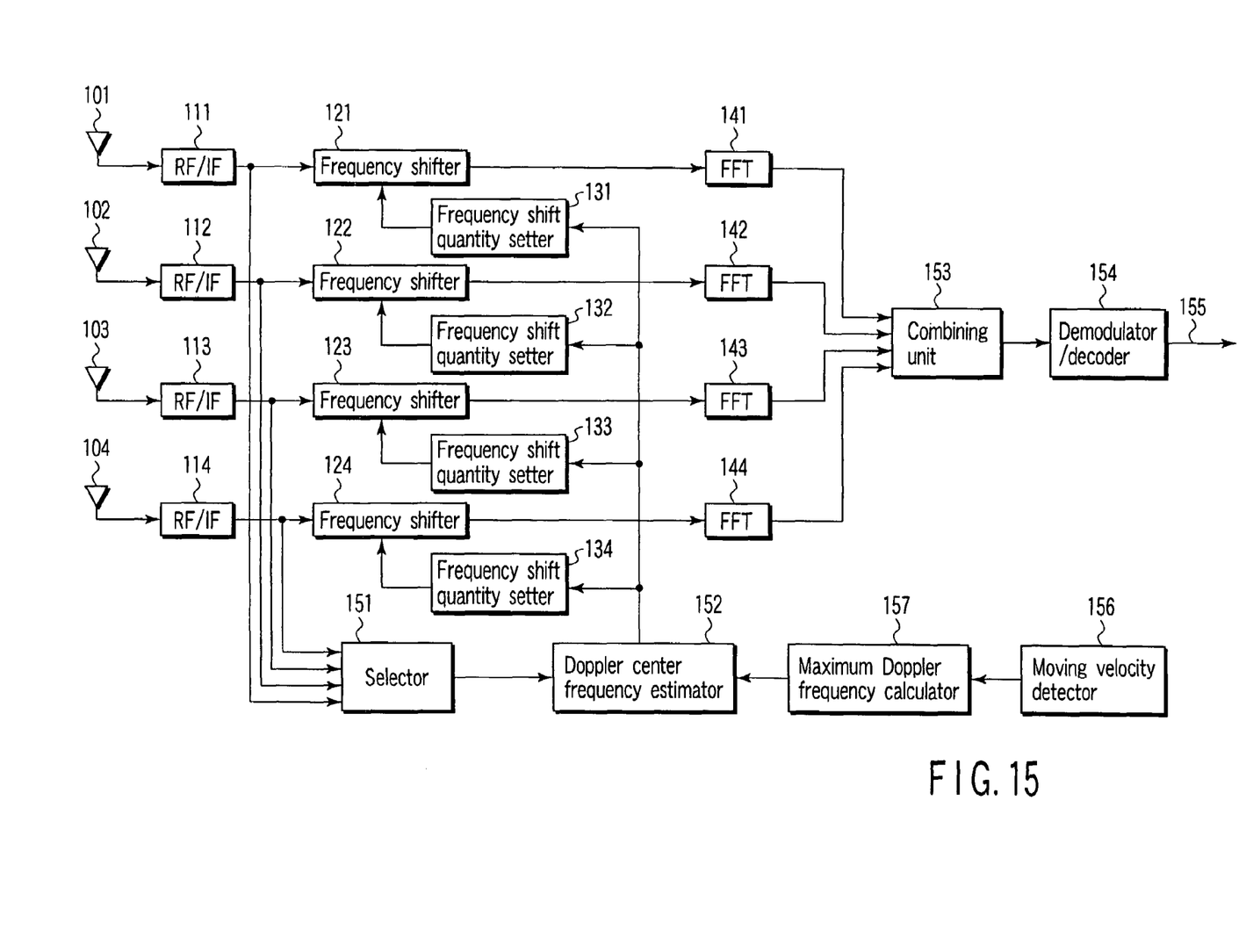
FIG. 15 is a block diagram of an OFDM receiver for a movable object, concerning the fifth embodiment of the present invention.

In the fifth embodiment of the present invention, a moving velocity detector 156 is added to the embodiment of FIG. 1 as shown in FIG. 15. The moving velocity detector 156 detects a moving velocity of a movable object by using, for example, Global Positioning System (GPS) or gyroscope. A maximum Doppler frequency calculator 157 calculates the maximum Doppler frequency according to a detected moving velocity. Information of the calculated maximum Doppler frequency is input to the Doppler center frequency estimator 152.

The Doppler center frequency estimator 152 receives the information of the maximum Doppler frequency, and estimates a Doppler center frequency in a frequency band not more than the maximum Doppler frequency. Theoretically, the Doppler component is not produced in the frequency band exceeding the maximum Doppler frequency settled by the moving velocity of movable object. Supposing that the Doppler component of such a frequency is observed, it is an error to occur from any cause. Consequently, when the Doppler center frequency is estimated in a frequency band not more than the maximum Doppler frequency, the frequency shift quantity for compensation of Doppler shift can be precisely set without the wrong estimation of Doppler center frequency. Another effect of the third embodiment is similar to the first embodiment, and thus its description is omitted.

The OFDM receiver for a movable object according to the embodiments of the present invention is particularly useful for a receiver of a ground digital television broadcast. The embodiments of the present invention can apply to an OFDM receiver for a movable object, for example, high-speed high capacity data communication system, and improve a receiving quality.

A variable directional antenna may be used as a directional antenna. Receiving circumstances of radio waves vary from hour to hour as a function of time and location (space). Accordingly, when a variable directional antenna is used, an effect of providing the best reception characteristics according to propagation environment is obtained. The variable directional antenna is constrained to an antenna configuration such as an adaptive array antenna and a sector antenna, and directivity of the antenna is controlled to realize optimum reception characteristics according to a radio wave propagation environment. As for a directivity control of a variable directional antenna, the directivity is changed according to a LOS (Line Of Site) environment or an NLOS (Non Line Of Site) environment, and the directivity is widely changed according to environmental factors such as the moving velocity of movable object and the strength and weakness of field intensity, whereby the receiving quality can be improved.

According to the present invention, since a center frequency of a spectrum of a Doppler component is estimated from a signal selected from the received signals of a plurality of directional antennas or obtained by multiplexing the received signals, it is possible to reduce an interference between carriers due to Doppler shift with the movement of a movable object while decreasing a circuit scale required for estimation without depending upon increase of the number of antennas Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An OFDM receiver apparatus mounted on a movable object for receiving an orthogonal frequency division multiplex (OFDM) signal, the OFDM receiver apparatus comprising:
   a plurality of directional antennas which receive an OFDM signal and output received signals, respectively;
   a moving velocity detector to detect a moving velocity of the movable object;
   a calculator to calculate a maximum Doppler center frequency from the moving velocity;
   an estimator to estimate a center frequency of a spectrum of a Doppler component in a frequency band not more than the maximum Doppler frequency from one of the received signals or a multiplexed signal obtained by multiplexing the received signals;
   a shift quantity calculator to calculate at least one shift quantity from the estimated center frequency of the estimator and directivity information representing directivity directions of the directional antennas;
   a plurality of frequency shifters to subject the received signals to frequency shift according to the shift quantity to compensate for Doppler shift;
   a combining unit configured to diversity-combine frequency shifted signals of the frequency shifters; and
   a demodulator/decoder to demodulate and decode combining diversity signals of the combining unit.

2. The OFDM receiver apparatus according to claim 1, further comprising a selector to select at least one received signal from the received signals and supply it to the estimator.

3. The OFDM receiver apparatus according to claim 1, wherein the directional antennas include a first antenna having directivity in a moving direction of the movable object and a second antenna having directivity in a direction opposite to the moving direction, and the selector is configured to select one of the received signals from the first antenna and the second antenna.

4. The OFDM receiver apparatus according to claim 3, wherein the selector selects one received signal having a good receiving quality from among the received signals output from the first antenna and the second antenna.

5. The OFDM receiver apparatus according to claim 1, further comprising a multiplexer to multiplex the received signals to output the multiplexed signal.

6. The OFDM receiver apparatus according to claim 1, wherein the OFDM signal includes a known signal sequence, and the estimator extracts the Doppler component by subjecting a time variation of a channel response of the known signal sequence to fast Fourier transform, and estimates the center frequency from the Doppler component.

7. The OFDM receiver apparatus according to claim 6, wherein the estimator extracts the Doppler component from each of subcarriers of the known signal sequence, averages extracted Doppler components between the subcarriers to obtain an averaged Doppler component, and estimates the center frequency with respect to the averaged Doppler component.

8. The OFDM receiver apparatus according to claim 6, wherein the estimator extracts the Doppler component from each of subcarriers of the known signal sequence, selects one Doppler component having a relatively larger signal-to-noise ratio from among extracted Doppler components corresponding to the subcarriers, and estimates the center frequency with respect to the selected Doppler component.

9. The OFDM receiver apparatus according to claim 6, wherein the estimator extracts the Doppler component from each of subcarriers of the known signal sequence, selects several Doppler components each having a relatively larger signal-to-noise ratio from among extracted Doppler components corresponding to the subcarriers, average the selected Doppler components between the subcarriers to obtain an averaged Doppler component, and estimates the center frequency with respect to the averaged Doppler component.

10. The OFDM receiver apparatus according to claim 1, wherein the estimator comprises an acquiring unit configured to acquire a time variation of a symbol of the OFDM signal, a generating unit configured to generate a Doppler spectrum by subjecting a plurality of blocks obtained by dividing the time variation to fast Fourier transform, and an estimating unit configured to estimate the Doppler center frequency from an average of a sum obtained by adding all Doppler spectra generated for all subcarriers.

11. The OFDM receiver apparatus according to claim 1, wherein the directional antennas each comprises an adaptive array antenna or a sector antenna.

12. The OFDM receiver apparatus according to claim 1, wherein the directional antennas comprise four antennas arranged with directivity in four directions of all around with respect to a moving direction of a movable object.

13. The OFDM receiver apparatus according to claim 1, further comprising a plurality of frequency converters connected between the directional antennas and the frequency shifters respectively to convert the received signals into signals of an intermediate frequency band.

14. A method of receiving an orthogonal frequency division multiplex (OFDM) signal with an OFDM receiver apparatus mounted on a movable object, the method comprising:
receiving an OFDM signal with a plurality of directional antennas to obtain a plurality of received signals;
detecting a moving velocity of the movable object;
calculating a maximum Doppler center frequency from the moving velocity;
estimating a center frequency of a spectrum of a Doppler component in a frequency band not more than the maximum Doppler frequency from one of the received signals or a multiplexed signal obtained by multiplexing the received signals;
calculating at least one shift quantity from the estimated center frequency and directivity information representing directivity directions of the directional antennas;
frequency-shifting the received signals according to the shift quantity to compensate for Doppler shift;
diversity-combining frequency shifted signals obtained by the frequency-shifting; and
demodulating and decoding combining diversity signals obtained by the diversity-combining.

15. The method according to claim 14, further comprising selecting one received signal having a good receiving quality from among the received signals output from the antennas to subject it to the center frequency estimating.

16. The method according to claim 14, wherein the OFDM signal includes a known signal sequence, and the estimating includes extracting the Doppler component by subjecting a time variation of a channel response of the known signal sequence to fast Fourier transform, and estimating the center frequency from the Doppler component.

17. The method according to claim 14, wherein the OFDM signal includes a known signal sequence, and the estimating includes extracting the Doppler component from each of subcarriers of the known signal sequence, averaging extracted Doppler components between the subcarriers to obtain an averaged Doppler component, and estimating the center frequency with respect to the averaged Doppler component.

18. The method according to claim 14, wherein the OFDM signal includes a known signal sequence, and the estimating includes extracting the Doppler component from each of subcarriers of the known signal sequence, selecting one Doppler component having a relatively larger signal-to-noise ratio from among extracted Doppler components corresponding to the subcarriers, and estimating the center frequency with respect to the selected Doppler component.

19. The method according to claim 14, wherein the OFDM signal includes a known signal sequence, and the estimating includes extracting the Doppler component from each of subcarriers of the known signal sequence, selecting several Doppler components each having a relatively larger signal-to-noise ratio from among extracted Doppler components corresponding to the subcarriers, averaging the selected Doppler components between the subcarriers to obtain an averaged Doppler component, and estimating the center frequency with respect to the averaged Doppler component.

* * * * *